March 5, 1929.  M. TIBBETTS  1,704,228

FASTENING DEVICE

Filed Jan. 30, 1928

Inventor

Milton Tibbetts

Patented Mar. 5, 1929.

1,704,228

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

FASTENING DEVICE.

Application filed January 30, 1928. Serial No. 250,681.

This invention relates to fastening devices and more particularly to devices for securing together a plurality of elements.

An object of the invention is to provide a simple and convenient means for securing together telescopic members.

Another object of the invention is to provide a device for connecting two elements by means of a member expansible by deformation.

Another object of the invention is to fasten together a plurality of elements by means of a single member expansible by deformation to bind or wedge together the elements to be fastened.

A further object of the invention is to secure together a plurality of elements by means of a disc adapted to be deformed so that the periphery thereof is extended to function as a binding means.

A further object of the invention is to provide means for securing together telescopic elements by inserting therein an expansible member and expanding the member by deformation to bind the elements together.

A further object of the invention is to secure together telescopic elements by inserting therein a spacer and an expansible disc and deforming the disc to extend the diameter thereof, so that it will bind together the telescopic elements.

Yet a further object of the invention is to provide a disc adapted to be deformed so that its periphery is outwardly extended.

Still a further object of the invention is to provide a device for attaching a knob and tube which has the advantages of a positive connecting means, highly efficient in operation and yet of marked simplicity as a whole and in respect to each of its component parts, so that its manufacture is economically facilitated both as regards to parts and their assembly.

Figure 1:
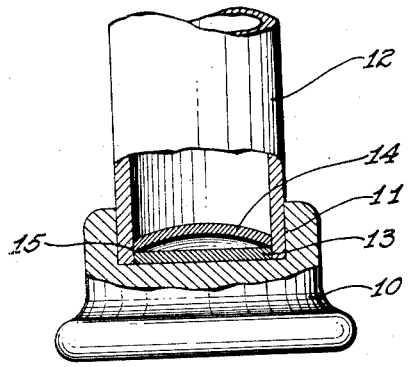
Figure 2:
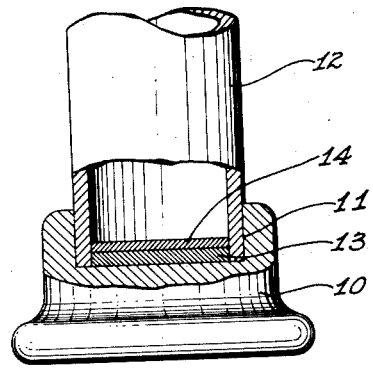
Figure 3:
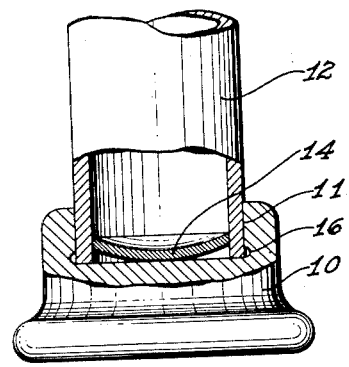
Figure 4:
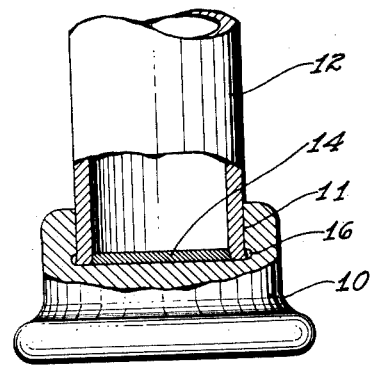
Figure 5:
Figure 6:

Other objects of the invention will appear from the following description taken in connection with the drawings which form a part of this specification, and in which:

Figure 1 is a side elevation of an assembled knob and a tube partly in section illustrating a spacer and a disc positioned in the tube, the disc being shown in concavo-convex form with its convex side turned upwardly, Figure 2 is a similar view showing the position of the disc after deformation thereof, Figure 3 is a side elevation of an assembled knob and tube partly in section with a disc positioned in the tube, illustrating a modified form, Figure 4 is a view similar to Fig. 3 showing the position of the disc after deformation, Figure 5 is a cross section of the disc with its convex side turned upwardly, and Figure 6 is a cross section of the disc with its concave side turned upwardly.

Referring to the drawings for more specific details of the invention, 10 represents a knob having a central bore 11. This knob may be of any structure or style suitable for the various purposes for which it may be intended. Fitted in the bore 11 is a tube 12, the outer diameter of which is substantially equal to the diameter of the bore, the tube being preferably formed of material permitting expansion when subjected to internal pressure, particularly when such pressure is distributed over a small area.

Fitted snugly in the tube is a spacer or spacing disc 13 of any suitable material and of any desirable thickness. This spacer positions with exactitude a connecting means comprising an expansible disc 14. The disc 14 is concavo-convex and its edge or periphery is parallel to the axis thereof as shown, or other forms of discs may be employed permitting expansion of their perimeters by deformation thereof.

As shown, the disc 14 prior to its deformation has substantially the same diameter as the inner diameter of the tube 12 to readily permit its introduction into the tube. Upon flattening the disc by any suitable means, such as by hammering or by pressure it is deformed to assume the position illustrated in Fig. 2 wherein the periphery of the disc is extended to slightly expand the wall of the tube and cause the tube to bind against the wall of the bore in the knob, thus effectively securing the tube and knob together.

Since before the deformation of the disc 14 its periphery is parallel to its axis, the edge 15 thereof will to a greater or less extent upon deformation of the disc bite into and imbed itself in the wall of the tube or the periphery of the disc will upon deformation of the disc conform to the contour of the inner diameter of the tube and in either instance will effectively bind the tube firmly in place against the wall of the bore in the knob.

The degree of expansion of the disc and the tube depends upon the accuracy with which the tube is fitted in the bore in the knob. In other words, the expansion of the disc and tube will take up any difference existing between the diameter of the bore in the knob and the outer diameter of the tube to provide a rigid and secure connection between these elements. This fastening means is particularly adaptable for securing together a plurality of telescopic elements, and is by no means to be considered solely as a securing means between a knob and a tube.

Figures 3 and 4 illustrate a modified form of the invention. In this form the spacer 13 is eliminated and the knob 10 is provided with a circumferential groove 16 positioned adjacent the bottom of the bore 11 in the knob 10. The tube 12 is fitted snugly in the bore 11 and is seated upon the bottom thereof and the disc 14 is introduced into the tube with its convex face or side bearing upon the bottom of the bore. Upon deformation of the disc by any suitable means the periphery thereof is extended to expand the wall of the tube at the end thereof to engage the groove 16 and thereby effectively secure the knob and tube together.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of my invention, what I claim is new and desire to secure by Letters Patent is:

1. A device for securing together a knob and a tube comprising a knob having a bore, a tube fitted in the bore, a spacer positioned in the tube and a concavo-convex disc upon the spacer adapted to be deformed to expand the perimeter thereof.

2. A method for securing together a knob and a tube comprising boring the knob, fitting a tube into the bore, inserting a spacer in the tube, introducing an expansible disc in the tube and deforming the disc to extend its perimeter to bind the wall of the tube against the wall of the bore.

In testimony whereof, I affix my signature.

MILTON TIBBETTS.